United States Patent
Weitzel et al.

(10) Patent No.: US 6,201,062 B1
(45) Date of Patent: Mar. 13, 2001

(54) METHOD FOR PRODUCING PROTECTIVE COLLOID-FREE DISPERSIONS AND DISPERSION POWDERS

(75) Inventors: Hans-Peter Weitzel, Reischach; Reiner Figge, Ampfing; Robert Braunsperger, Burghausen, all of (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/380,692

(22) PCT Filed: Mar. 6, 1998

(86) PCT No.: PCT/EP98/01314

§ 371 Date: Sep. 3, 1999

§ 102(e) Date: Sep. 3, 1999

(87) PCT Pub. No.: WO98/39371

PCT Pub. Date: Sep. 11, 1998

(30) Foreign Application Priority Data

Mar. 6, 1997 (DE) .............................. 197 09 254

(51) Int. Cl.[7] .............................. C08L 29/04; C08J 3/12; C08F 6/14
(52) U.S. Cl. .............................. 524/803; 524/5; 524/831; 523/342; 528/501; 528/503
(58) Field of Search .............................. 524/803, 831, 524/5; 523/342; 528/501, 503

(56) References Cited

U.S. PATENT DOCUMENTS

| | | |
|---|---|---|
| 3,287,290 | * 11/1966 | Bray, Jr. .............................. 523/342 |
| 3,714,096 | 1/1973 | Biale . |
| 3,950,302 | 4/1976 | Rauterkus . |
| 5,225,478 | 7/1993 | Beckerle et al. . |
| 5,567,750 | 10/1996 | Schulze et al. . |

FOREIGN PATENT DOCUMENTS

| | | |
|---|---|---|
| 935651 | 3/1958 | (CA) . |
| 2 222 033 | 11/1973 | (DE) . |
| 0 078 449 | 5/1983 | (EP) . |
| 0 134 451 | 3/1985 | (EP) . |
| 0 295 727 | 12/1988 | (EP) . |
| 0 315 278 | 5/1989 | (EP) . |
| 0 407 889 | 1/1991 | (EP) . |
| 0 518 406 | 12/1992 | (EP) . |
| 0 632 096 | 1/1995 | (EP) . |
| 2 183 810 | 12/1973 | (FR) . |

OTHER PUBLICATIONS

Derwent Abstract corresponding to EP 0 134 451.
Derwent Abstract corresponding to EP 0 078 449.

* cited by examiner

Primary Examiner—Tae Yoon
(74) Attorney, Agent, or Firm—Brooks & Kushman P.C.

(57) ABSTRACT

The invention relates to a method of producing protective colloid free, aqueous dispersions of vinyl ester co-polymers by radical emulsion polymerization of 40 to 99.5 weight percent vinyl acetate, 0 to 40 weight percent of one or several alkenes, 0 to 40 weight percent of one or several monomers from the group consisting of vinyl esters of $C_6$ to $C_{12}$ alkyl carboxylic acids, and of (meth)acrylic-acid esters of alcohols with 1 to 12 C atoms and optionally, additional copolymerizable mono- or poly-ethylenically unsaturated monomers. Said method is characterized in that 0.1 to 5 weight percent of one or several emulsifiers are polymerized with a persulfate initiator in the presence of 0.5 to 20 weight percent mono- or poly-ethylenically unsaturated carboxylic acid amides or derivatives thereof. The invention also relates to a method for producing protective colloid-free dispersion powders by spray drying or freeze drying said dispersions.

13 Claims, No Drawings

METHOD FOR PRODUCING PROTECTIVE COLLOID-FREE DISPERSIONS AND DISPERSION POWDERS

The invention relates to a process for the preparation of dispersion powders which are free from protective colloids by spray drying or freeze drying the dispersion.

Dispersion powders which are redispersible in water and are based on vinyl ester polymers are known from the prior art and are employed, above all, for modification of hydraulically setting building material compositions. These redispersible dispersion powders are in general prepared by spray drying the corresponding aqueous dispersions of the vinyl ester polymers. To ensure the redispersibility of the spray-dried dispersion powders in water, protective colloids are added during the polymerization in aqueous dispersion and/or during the spray drying process.

EP-A 632096 (U.S. Pat. No. 5,567,750) describes the spray drying of aqueous vinyl ester polymers in the presence of polyvinyl alcohol as a protective colloid for the atomization. It is known from EP-A 78449 (Derwent Abstract AN 83-46976K) to carry out the atomization with the addition of naphthalenesulphonic acid-formaldehyde condensation products. EP-A 407889 (U.S. Pat. No. 5,225,478) describes the atomization of aqueous polymer dispersions in the presence of phenolsulphonic acid-formaldehyde condensation products. EP-A 134451 (Derwent Abstract AN 85-069875) discloses the preparation of dispersion powders by spray drying of aqueous dispersions in the presence of starches or proteins.

However, the use of protective colloids during the preparation of the redispersible dispersion powders involves a number of disadvantages. The protective colloids are relatively expensive, but must be employed in significant amounts to ensure an adequate redispersibility or blocking resistance. At the required amounts to be employed, the relative binder content of the dispersion powders is reduced and the use properties of the dispersion powders are adversely influenced. Furthermore, the addition of protective colloids can render the dispersion powders sensitive to water and influence the rheology of the redispersion.

There was therefore the object of providing a process for the preparation of dispersion powders which are redispersible in water, free from protective colloids and based on vinyl ester polymers.

An emulsifier-free dispersion powder which is free from protective colloids is known from DE-A 2222033 (U.S. Pat. No. 3,950,302). A disadvantage is that the preparation process for the polymer dispersion described therein is not reproducible.

EP-A 295727 relates to the preparation of vinyl acetate/ethylene copolymer dispersions for use in coatings, a tertiary vinyl ester (VeoVa9$^R$) being copolymerized to reduce the tack. The copolymers obtainable by this process can also be employed as dispersions and dispersion powders which are free from protective colloids. The doctrine of EP-A 315278 is to carry out the copolymerization of vinyl acetate, ethylene and tertiary vinyl esters in the presence of acrylic acid esters in order to increase the conversion of the copolymerization. EP-A 518406 relates to the preparation of dispersions, which are free from protective colloids, of vinyl acetate copolymers with vinyl pivalate, one or more water-soluble comonomers being copolymerized. Although dispersions which are free from protective colloids are accessible by the procedures described therein, the polymer powders obtainable by these procedures show only a very moderate redispersibility.

The invention relates to a process for the preparation of dispersion powders which are free from protective colloids and redispersible in water, by spray drying or freeze drying of aqueous dispersions, which are free from protective colloids, of vinyl ester copolymers obtainable by free-radical emulsion polymerization of 40 to 99.5% by weight of vinyl acetate, 0 to 40% by weight of one or more alkenes, 0 to 40% by weight of one or more monomers from the group consisting of vinyl esters of $C_6$- to $C_{12}$-alkylcarboxylic acids and (meth)acrylic acid esters of alcohols having 1 to 12 C atoms, and, if appropriate, further copolymerizable mono- or polyethylenically unsaturated monomers, and of 0.5 to 20% by weight of ethylenically unsaturated carboxylic acid amides or derivatives thereof, in the presence of 0.1 to 5% by weight of one or more emulsifiers from the group consisting of anionic and nonionic emulsifiers, and a persulphate initiator, the spray drying or freeze drying being carried out without the addition of protective colloids.

The data in % by weight here are in each case based on the total weight of the comonomers.

Suitable alkenes are, for example, ethylene, propylene and butadiene, preferably ethylene and butadiene, in particular ethylene.

Preferred vinyl esters having 6 to 12 C atoms are vinyl ethylhexanoate, vinyl laurate and vinyl esters of alpha-branched, tertiary carboxylic acids having 9 to 11 C atoms, such as VeoVa9$^R$, VeoVa10$^R$ or VeoVa11$^R$. The vinyl esters of alpha-branched, tertiary carboxylic acids having 9 to 11 C atoms are preferred.

Preferred carboxylic acid amides are acrylamide and methacrylamide. Preferred carboxylic acid amide derivatives are N-methylolacrylamide, N-methylolmethacrylamide, N-butoxymethylacrylamide, N-butoxymethylmethacrylamide, N-isobutoxymethylacrylamide and N-isobutoxymethylmethacrylamide. Particularly preferred amides are acrylamide and methacrylamide; in particular acryl-amide.

Examples of methacrylic acid esters or acrylic acid esters are their methyl, ethyl, propyl, n-butyl, i-butyl, t-butyl and 2-ethylhexyl esters. Examples of further copolymerizable mono- or polyethylenically unsaturated monomers are styrene, vinyl chloride, acrylic acid, methacrylic acid, fumaric acid and maleic acid and monoesters and diesters thereof, maleic anhydride, 2-acrylamidopropanesulphonic acid and vinylsulphonic acid. Examples of polyethylenically unsaturated comonomers are divinyl adipate, 1,9-decadiene, allyl methacrylate, triallyl cyanurate and crosslinking comonomers, such as acrylamidoglycolic acid (AGA), methacrylamidoglycolic acid methyl ester (MAGME) and polyglycol dimethacrylate. Further examples are Si-containing monomers, such as gamma-acryloxypropyltriethoxysilane or vinyltriethoxysilane.

In a preferred embodiment, the comonomer phase comprises 60 to 98% by weight of vinyl acetate, 0 to 30% by weight of ethylene and 2 to 10% by weight of ethylenically unsaturated carboxylic acid amides or derivatives thereof.

The preparation by the process of aqueous emulsion polymerization is carried out at a polymerization temperature of in general 35° C. to 95° C., preferably at 40° C. to 80° C. Persulphates which are suitable for initiation of the polymerization are sodium persulphate, potassium persulphate and ammonium persulphate. The amount of initiator is preferably 0.01 to 1.0% by weight, based on the total weight of the comonomers. In a preferred embodiment, the persulphates are employed in combination with the corresponding amount of reducing agent. Suitable reducing agents are, for example, alkali metal formaldehydesulphoxylates, hydroxymethanesulphinic acid, ascorbic acid or sodium sulphite.

Suitable anionic emulsifiers are, for example, alkali metal salts of di-$C_4$- to -$C_{12}$alkyl esters of sulphosuccinic acid; alkali metal and ammonium salts of $C_8$- to $C_{12}$-alkyl sulphates, of ethoxylated alkanols having a $C_{12}$- to $C_{18}$-alkyl radical and a degree of EO of 3 to 50, of ethoxylated $C_4$- to $C_{10}$-alkylphenols having a degree of EO of 3 to 50, of $C_{12}$- to $C_{18}$-alkylsulphonic acids, of $C_9$- to $C_{18}$-alkylarylsulphonic acids and of sulphonates of ethoxylated, linear and branched $C_8$- to $C_{36}$-alkyl alcohols having a degree of EO of 3 to 50 are also suitable. Suitable nonionic emulsifiers are, for example, ethoxylated fatty alcohols having a $C_8$- to $C_{36}$-alkyl radical and a degree of ethoxylation (degree of EO) of 3 to 50; and ethoxylated mono-, di- and trialkylphenols having a $C_4$- to $C_{10}$-alkyl radical and a degree of EO of 3 to 50.

The polymerization is preferably carried out in the presence of an anionic emulsifier or of combinations of an anionic and nonionic emulsifier. Combinations of alkali metal salts of di-$C_4$- to -$C_{12}$-alkyl esters of sulphosuccinic acid and of ethoxylated fatty alcohols having a $C_8$- to $C_{36}$-alkyl radical and a degree of ethoxylation (degree of EO) of 3 to 50 are particularly preferred. The total amount of emulsifier is preferably 0.1 to 5% by weight, in particular 0.5 to 3% by weight, based on the total weight of the comonomers.

The polymerization can be carried out by the batch process, all the components being initially introduced into the reactor, and by the metering process, individual or several components being added during the polymerization. A procedure in which a portion of the vinyl acetate or vinyl ester monomers is initially introduced and the remainder is metered in during the polymerization is preferred. The carboxylic acid content is preferably metered in in its entirety. The initiators are preferably metered in in their entirety. The emulsifier content is preferably initially introduced in part, and the remainder is metered in during the polymerization. The meterings can be carried out separately (with respect to space and time), or the components to be metered can be metered entirely or partly in preemulsified form. The meterings can be carried out at a constant rate and at varying rates.

If, for example, gaseous reaction components, such as ethylene, are to be employed, the emulsion polymerization can also be carried out under increased pressure. If it is carried out under pressure, pressures from 5 bar to 100 bar are preferred. The target amount of ethylene which is to be copolymerized, for example, is decisive.

To control the molecular weight, regulating substances can be employed during the polymerization. They are usually employed in amounts of between 0.01 and 5.0% by weight, based on the monomers to be polymerized, and are metered separately or also as a premix with the reaction components. Examples of such substances are dodecylmercaptan, mercaptopropionic acid, methyl mercaptopropionate, isopropanol and acetaldehyde.

The aqueous dispersions obtainable by the process according to the invention have a solids content of 30 to 75% by weight, preferably 40 to 65% by weight. To prepare the dispersion powders which are free from protective colloids and are redispersible in water, the aqueous dispersions are spray dried or freeze dried without addition of protective colloids. Preferably, the dispersions are spray dried.

The known devices can be used for the spray drying, such as, for example, spraying through one-, two- or multicomponent nozzles or with a rotating disc, in a stream of dry gas, preferably air, which may be heated. In general, temperatures above 250° C. are not used as the intake temperature of the drying gas. The exit temperatures of the drying gas are in general in the range from 45 to 100° C., preferably 55 to 90° C., depending on the plant, the polymer composition and the desired degree of drying.

For the drying, the dispersions are brought to a solids content of 10 to 75% by weight, preferably 30 to 65% by weight. A viscosity of the total system of up to 1000 mPa.s has proved appropriate for the spray drying. A content of up to 1.5% by weight of antifoam, based on the base polymer, has often proved favourable for the atomization.

To increase the storage stability by improving the blocking stability, in particular in powders of low glass transition temperature, an antiblocking agent (anticaking agent), preferably up to 30% by weight, based on the total weight of polymeric constituents, can be added to the resulting powder. This is preferably carried out as long as the powder is still finely divided, for example still suspended in the drying gas. In particular, the antiblocking agent is metered into the drying device separately but simultaneously with the dispersion. Examples of antiblocking agents are finely ground aluminium silicates, kieselguhr, colloidal silica gel, pyrogenic silicic acid, precipitated silicic acid, micro-silica, ground gypsum, kaolin, talc, cements, diatomaceous earth, calcium carbonate or magnesium hydrosilicate. The dispersions and dispersion powders which are free from protective colloids and are obtainable by the procedures according to the invention are suitable as binders for coatings, adhesives, plasters and paints. The dispersions and dispersion powders which are free from protective colloids are particularly suitable as binders for coating compositions and adhesives for textiles, and as additives for upgrading binders in the building industry, in particular as additives to concrete, building adhesives, mortars and filler compositions.

EXAMPLE 1

Preparation of a Dispersion which is Free from Protective Colloids 70.7 kg of water, 0.2 kg of acetic acid, 0.2 kg of diisohexyl sulphosuccinate, 0.25 kg of 10% strength sodium hydroxide solution and 14.7 kg of vinyl acetate were initially introduced into an autoclave with a volume of 570 liters and a stirrer and feeds for four meterings and an ethylene supply, and the mixture was heated to 75° C. The speed of rotation was 140 rpm. 60 bar of ethylene were then forced in. When the reaction conditions had been reached, the initial metering (35 kg of 3% strength potassium persulphate solution and 35 kg of 1.5% strength Na formaldehydesulphoxylate solution) was started. After 25 minutes, the monomer metering (242.5 kg of vinyl acetate and 13.2 kg of VeoVa10) and the emulsifier metering (26.4 kg of water, 0.8 kg of 10% strength NaOH, 36.6 kg of 30% strength acrylamide solution, 2.75 kg of 50% strength acrylamidopropanesulphonic acid solution and 3.4 kg of a 40% strength solution of a sulphated alkyl ethoxylate with 15 EO units) were started. Both meterings ran for 5 hours. The internal temperature was regulated such that a reaction temperature of 75° C. was maintained. The pressure was kept constant at 60 bar until the end of the metering of monomers. When the metering of monomers had ended, the initiator was metered further for another 1 hour. Thereafter, the mixture was cooled and, from 60° C., was let down into a suitable tank, excess ethylene being disposed of into the waste gas system. A dispersion having a polymer content of 60.2% was obtained. The dynamic glass transition temperature was −1° C.

EXAMPLE 2

Preparation of a Dispersion Powder which is Free from Protective Colloids

The dispersion from Example 1 was dried in a conventional spray dryer at an intake temperature of 120° C. and an exit temperature of 80° C., with the addition of 10% by weight of a commercially available antiblocking agent, to give a readily free-flowing powder.

EXAMPLE 3

Preparation of a Dispersion which is Free from Protective Colloids 70.2 kg of water, 0.2 kg of acetic acid, 0.2 kg of diisohexyl sulphosuccinate, 0.25 kg of 10% strength sodium hydroxide solution and 14.7 kg of vinyl acetate were initially introduced into an autoclave with a volume of 570 liters, a stirrer and feeds for four meterings and an ethylene supply and the mixture was heated to 75° C. The speed of rotation was 140 rpm. 70 bar of ethylene were then forced in. When the reaction conditions had been reached, the initiator metering (53 kg of 3% strength potassium persulphate solution and 53 kg of 1.5% Na formaldehydesulphoxylate solution) was started. After 25 minutes, the monomer metering (139 kg of vinyl acetate and 66 kg of VeoVa10) and the emulsifier metering (21.1 kg of water, 0.7 kg of 10% strength NaOH, 29.2 kg of 30% strength acrylamide solution, 2.2 kg of 50% strength acrylamidopropanesulphonic acid solution and 2.7 kg of a 40% strength solution of a sulphated alkyl ethoxylate with 15 EO units) were started. The two meterings ran for 5 hours. The internal temperature was regulated such that a reaction temperature of 75° C. was maintained. The pressure was kept constant at 70 bar until the end of the metering of the monomers. When the metering of the monomers had ended, the initiator was metered further for another 1 hour. Thereafter, the mixture was cooled and, from 60° C., was let down into a suitable tank. A dispersion having a polymer content of 54.5% was obtained. The dynamic glass transition temperature was –14° C.

EXAMPLE 4

Preparation of a Dispersion Powder which is Free from Protective Colloids

The dispersion from Example 3 was dried analogously to the procedure from Example 2 to give a readily free-flowing powder.

COMPARISON EXAMPLE 1

Preparation of a Dispersion which is Free from Protective Colloids and has an Acrylic Acid Content Instead of an Acrylamide Content 804 g of water, 10.3 g of acetic acid, 1.5 g of diisohexyl sulphosuccinate, 8 g of 10% strength sodium hydroxide solution and 115 g of vinyl acetate were initially introduced into an autoclave with a volume of 5 litres, a stirrer and feeds for four meterings and an ethylene supply and the mixture was heated to 75° C. The speed of rotation was 300 rpm. 75 bar of ethylene were then forced in. When the reaction conditions had been reached, the initiator metering (700 g of 3% strength potassium persulphate solution and 700 g of 1.5% strength Na formaldehyde sulphoxylate solution) was started. After 25 minutes, the monomer metering (1250 g of vinyl acetate and 340 g of VeoVa10) and the emulsifier metering (667 kg of water, 5 g of 10% strength NaOH, 85.5 g of acrylic acid, 17.1 g of 50% strength acrylamidopropanesulphonic acid solution, and 21.4 g of a 40% strength solution of a sulphated alkyl ethoxylate with 15 EO units) were started. The two meterings ran for 5 hours. The internal temperature was regulated such that a reaction temperature of 75° C. was maintained. The pressure was kept constant at 70 bar until the end of metering of the monomers. When the metering of the monomers had ended, the initiator was metered further for another 1 hour. Thereafter, the mixture was cooled and, from 60° C., was let down into a suitable tank.

A dispersion having a polymer content of 39.6% was obtained. The dynamic glass transition temperature was –8° C.

COMPARISON EXAMPLE 2

Preparation of a Dispersion Powder which is Free from Protective Colloids

The dispersion from Comparison Example 1 was dried analogously to the procedure from Example 2 to give a readily free-flowing powder.

COMPARISON EXAMPLE 3

Preparation of a Dispersion which is Free from Protective Colloids Analogously to DE-A 2222033

The procedure was analogous to the example from DE-A 2222033. It was not possible to initiate the polymerization. No dispersion was obtained.

COMPARISON EXAMPLE 4

A dispersion which is free from protective colloids was prepared with a weight ratio of VA/VV5 of 70:30 analogously to the Example from EP-A 518406. A dispersion having a polymer content of 54.4% was obtained. The dynamic glass transition temperature was 17° C.

COMPARISON EXAMPLE 5

The dispersion which is free from protective colloids and was obtained according to Comparison Example 4 was spray dried analogously to the procedure from Example 2.

To test the dispersions and dispersion powders from the examples and comparison examples, the redispersibility of polymer films produced with the dispersions was tested, the redispersibility of the dispersion powders was tested, and the water resistance of cement modified with a dispersion powder was investigated.

The results are summarized in the table.

Measurement Methods

Redispersibility of the Polymer Films Obtainable with the Dispersions

A dispersion film with a wet layer thickness of 500 $\mu$m was drawn on a glass plate with the aid of a doctor blade. The film was then dried at 60° C. for 24 hours. To investigate the redispersibility, a drop of water was placed on the film by means of a pipette. After 60 seconds, the drop of water was rubbed on the film and the redispersibility was evaluated visually: rating 1: film redisperses immediately; rating 2: film redisperses slowly; rating 3: film redisperses only partly; rating 4: film does not redisperse at all.

Redispersibility of the Dispersion Powders

Equal parts by weight of water were added to the powder obtained by spray drying and the mixture was stirred for 5 minutes until a homogeneous dispersion was obtained. This dispersion was then introduced into a glass tube with a scale (7 mm×10 cm) and the extent of sedimentation of non-redispersed parts after 24 hours was observed.

Rating 1: no sediment; rating 2: 0.1 mm deposit; rating 3: 0.5 mm deposit; rating 4: 1 mm deposit; rating 5: >1 mm deposit.

Water Resistance of the Cement Film

A dry mortar was prepared from equal parts by weight of cement (CEMI 32.5) and dispersion powder and was converted into a ready-to-use composition by addition of water. A cement film with a layer thickness of 500 μm was drawn with the aid of a doctor blade and was dried at room temperature for 48 hours. A drop of water was placed on this cement film by means of a pipette and the water resistance of the film was evaluated visually by rubbing with the finger. Rating 1: water-resistant; rating 2: film partly disintegrates (low water resistance); rating 3: film disintegrates completely (not water-resistant).

The examples according to the invention show a good redispersibility in the dispersion film and in the powder, while the cement film is inert towards water. In contrast, the comparison examples show that the particular products are not sufficiently redispersible and induce sensitivity to water when used in cement.

TABLE

| Example | Redispersibility Dispersion film | Redispersibility Powder | Water resistance Cement film |
| --- | --- | --- | --- |
| Example 1 | 1 | — | — |
| Example 2 | — | 2 | 1 |
| Example 3 | 1 | — | — |
| Example 4 | — | 2 | 1 |
| Comparison Example 1 | 4 | — | — |
| Comparison Example 2 | — | 4 | 3 |
| Comparison Example 3 | — | — | — |
| Comparison Example 4 | 4 | — | — |
| Comparison Example 5 | — | 5 | 3 |

What is claimed is:

1. Process for the preparation of dispersion powders which are free from protective colloids and are redispersible in water, said process comprising spray drying or freeze drying of aqueous dispersions of vinyl ester copolymers obtained by free-radical emulsion polymerization of a polymerizable composition, comprising:

40 to 99.5% by weight of vinyl acetate, 0 to 40% by weight of one or more alkenes, 0 to 40% by weight of one or more monomers from the group consisting of vinyl esters of $C_6$- to $C_{12}$-alkyl-carboxylic acids and (meth)acrylic acid esters of alcohols having 1 to 12 C atoms, and optionally further copolymerizable mono- or polyethylenically unsaturated monomers, and 0.5 to 20% by weight of ethylenically unsaturated carboxylic acid amides or derivatives thereof, in the presence of 0.1 to 5% by weight of one or more emulsifiers from the group consisting of anionic and nonionic emulsifiers, and a persulphate initiator, the spray drying or freeze drying being carried out without the addition of protective colloids, the data in % by weight in each case being based on the total weight of the comonomers.

2. In a coating, adhesive, plaster, or paint employing a binder or additive which is a redispersible powder, the improvement comprising employing as said redispersible powder, the product produced by the process of claim 1.

3. In concrete, building adhesives, mortars, and filler compositions employing an additive which is a redispersible powder, the improvement comprising employing as said redispersible powder, the product produced by the process of claim 1.

4. The process of claim 1, wherein said polymerizable composition comprises vinylacetate in an amount of from 60–98%, ethylene in an amount of 3–30% by weight, and an ethylenically unsaturated carboxylic acid amide or derivative thereof in an amount of 2–10%.

5. The process of claim 1, wherein said ethylenically unsaturated carboxylic acid amide or derivative thereof comprises one or more of the amides selected from the group consisting of acrylamide, N-methylolacrylamide, N-methylolmethylacrylamide, N-butoxymethylacrylamide, N-butoxymethylmethacrylamide, N-isobutoxymethylacrylamide, and N-isobutoxymethylacrylamide.

6. The process of claim 4, wherein said ethylenically unsaturated carboxylic acid amide or derivative thereof comprises one or more of the amides selected from the group consisting of acrylamide, N-methylolacrylamide, N-methylolmethylacrylamide, N-butoxymethylacrylamide, N-butoxymethylmethacrylamide, N-isobutoxymethylacrylamide, and N-isobutoxymethylacrylamide.

7. In a coating, adhesive, plaster, or paint employing a binder or additive which is a redispersible powder, the improvement comprising employing as said redispersible powder, the product produced by the process of claim 4.

8. In a coating, adhesive, plaster, or paint employing a binder or additive which is a redispersible powder, the improvement comprising employing as said redispersible powder, the product produced by the process of claim 5.

9. In concrete, building adhesives, mortars, and filler compositions employing an additive which is a redispersible powder, the improvement comprising employing as said redispersible powder, the product produced by the process of claim 4.

10. In concrete, building adhesives, mortars, and filler compositions employing an additive which is a redispersible powder, the improvement comprising employing as said redispersible powder, the product produced by the process of claim 5.

11. A redispersible, film forming polymer powder composition comprising the protective colloid-free composition prepared by the process of claim 1.

12. A redispersible, film forming polymer powder composition comprising the protective colloid-free composition prepared by the process of claim 4.

13. A redispersible, film forming polymer powder composition comprising the protective colloid-free composition prepared by the process of claim 5.

* * * * *

UNITED STATES PATENT AND TRADEMARK OFFICE
CERTIFICATE OF CORRECTION

PATENT NO. : 6,201,062 B1
DATED : March 13, 2001
INVENTOR(S) : Hans-Peter Weitzel, et al.

It is certified that error appears in the above-identified patent and that said Letters Patent is hereby corrected as shown below:

<u>Title page,</u>
Item [54], delete the Title "METHOD FOR PRODUCING PROTECTIVE COLLOID-FREE DISPERSIONS AND DISPERSION POWDERS" and insert -- PROCESS FOR THE PREPARATION OF DISPERSIONS AND DISPERSION POWDERS WHICH ARE FREE FROM PROTECTIVE COLLOIDS --.

Signed and Sealed this

Sixteenth Day of October, 2001

*Attest:*

*Attesting Officer*

NICHOLAS P. GODICI
*Acting Director of the United States Patent and Trademark Office*